W. W. STAUFFER.
COOLING SYSTEM FOR MOTOR VEHICLES.
APPLICATION FILED SEPT. 11, 1918.

1,311,470.　　　　　　　　　　　Patented July 29, 1919.

INVENTOR
Wilbert W. Stauffer

Herbert E. Smith
ATTORNEY

UNITED STATES PATENT OFFICE.

WILBERT W. STAUFFER, OF WILBUR, WASHINGTON.

COOLING SYSTEM FOR MOTOR-VEHICLES.

1,311,470.　　　　Specification of Letters Patent.　　Patented July 29, 1919.

Application filed September 11, 1918. Serial No. 253,567.

*To all whom it may concern:*

Be it known that I, WILBERT W. STAUFFER, a citizen of the United States, residing at Wilbur, in the county of Lincoln and State of Washington, have invented certain new and useful Improvements in Cooling Systems for Motor-Vehicles, of which the following is a specification.

The present invention relates to an improved cooling system for tractors of the automobile type and is designed especially for use in connection with farm tractors or agricultural machines, the primary object of the invention being the provision by means of which the water employed in connection with the internal combustion engine of the tractor may be regulated as to gine of the tractor may be regulated as to its temperature, and kept or maintained in the proper condition for most efficient use of the motor of the tractor or automobile.

The present invention is designed to eliminate certain objectionable features now accompanying the use of fans employed for cooling the water as it circulates through the radiator of the motor. Most of the fans with which the inventor is familiar, draw the air through the radiator, and are located between the radiator and the engine, so that the air cools the water in the radiator, but the air itself conveys the heat from the water back to the engine, thus effecting a condition that is undesirable, especially where hard work is required of the engine.

To eliminate objectionable features and to overcome other difficulties, the invention contemplates the use of a cooling system located in front of the engine, but with the radiator in position so that the air may be driven therethrough by a fan sending a current in a direction at right angles to the longitudinal plane of the engine, instead of parallel therewith.

In the accompanying drawings one complete example of the physical embodiment of the invention is illustrated, the position of the engine, radiator, water tank and connections being combined and arranged according to the best mode so far devised for the practical application of the principles of the invention.

Figure 1:
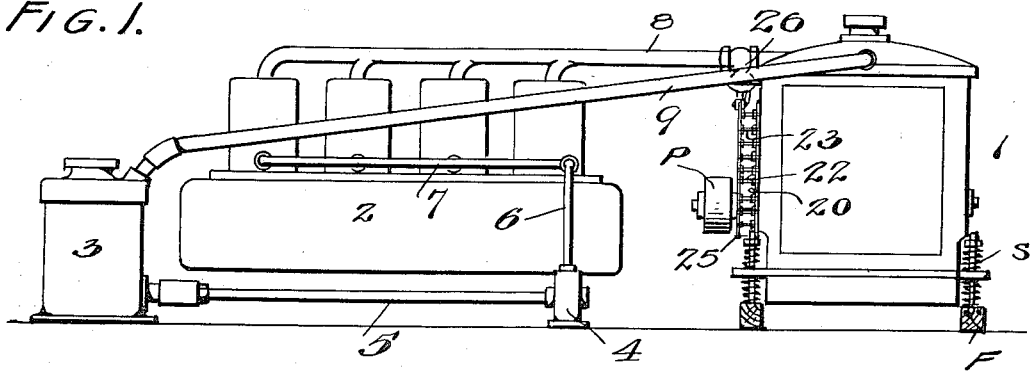
Figure 1 is a view in elevation showing the parts of the invention in their general relation to the engine or motor.
Figure 2:
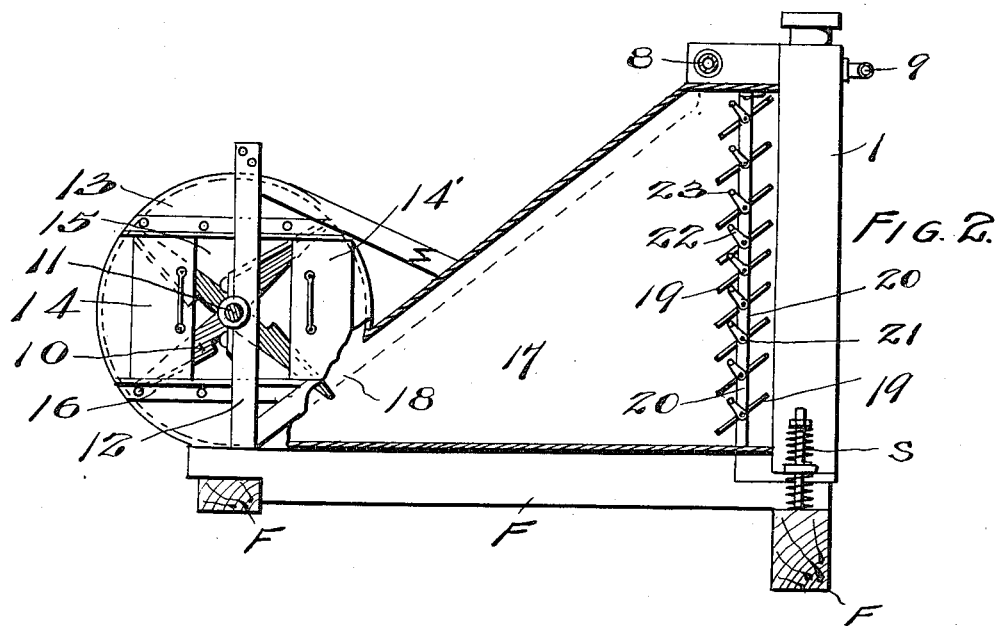
Fig. 2 is a sectional view, looking toward the right in Fig. 1, showing the radiator on an enlarged scale with its cooling fan and connections.

In the preferred embodiment of the invention as illustrated in the drawings, the radiator 1 is of usual type, being supported upon the usual spring supports S, S, on the frame indicated by the letters F. This frame is part of the chassis of an automobile, automobile truck, or auto-tractor, and the motor or engine is indicated by the numeral 2, the water tank 3 having the circulation pump 4 with pipes 5, 6, 7 for supplying water to engine jackets as usual, and the pipe 8 carries the heated air from the engines to the radiator, while pipe 9 is the return pipe from the radiator to the water tank.

Figure 3:
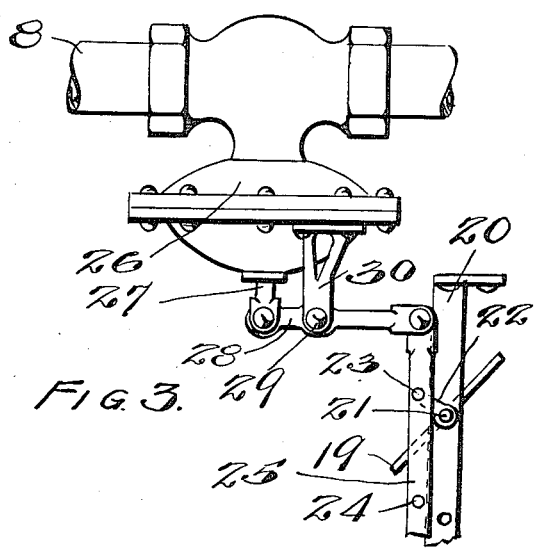
Fig. 3 is an enlarged detail view of the thermostatic regulator for a series of shutters used in proximity to the radiator for controlling and regulating the entrance of air currents to the radiators.

The radiator 1 and its fan 10 are located in front of the engine, and the fan shaft 11 which is journaled in the frame 12, is driven from the engine through the pulley P by suitable connections, so that the fan will revolve within the cylindrical casing 13 supported on the frame F. The open end of the casing may be regulated by the two slide doors 14 and 14' to vary the size of the inlet 15 and these two doors may slide in the flanged guides 16. The blast or air currents are driven toward the radiator through an inclosed chute or nozzle 17 which has a restricted throat 18 communicating with the interior of the fan casing, and the walls of the nozzle or chute diverge as shown to provide for conveying the air currents over a comparatively wide area to all parts of the radiator, and the admission of the air currents to the radiator for cooling the water therein is controlled and regulated by the series of shutters 19. These shutters are disposed horizontally back of the radiator and form distributers for the air currents to the radiator. The shutters are journaled in upright posts 20, one at each side of the radiator, the journals or pintles of the shutters being designated 21, and on the ends of the journals are fixed crank arms 22 provided at their ends with crank pins 23 that fit in the openings or bearings 24 of an upright connecting rod 25. This rod is actuated or reciprocated vertically by thermostatic changes in the temperature of the water in the engine pipe 8, through the instrumentality of a thermostat indicated at 26, and of well known type, whose operating stem 27 actuates the lever 28 pivoted at 29 in the bracket 30 and pivotally connected to the connecting rod 25, as best seen in Fig. 3.

By the heat in the water of the hot water pipe 8 and of the thermostat 26 the position of the shutters is regulated; thus, should the heat become excessive in the water, the thermostatic regulator is actuated so that the shutters are opened to the extreme to permit sufficient air currents to be forced through the radiator from the fan to cool the water; or should the temperature of the water be low (comparatively) the shutters are automatically turned to more completely shut off the air passing to the radiator, and in this manner the desired temperature of the water in the cooling system is automatically maintained. The quantity of air to be impelled by the fan is controlled and regulated by the two slide doors 14 and 14' for increasing or diminishing the size of the opening 15 in usual manner, and it will be understood that the air drawn into the casing is not taken from proximity of the engine or motor 2.

Claims:—

1. The combination in a cooling system as described including the motor, radiator and water circulation devices as described, of a fan and its casing and a chute connecting the casing with the radiator, and means within the chute operated by a thermostat in the cooling system for regulating the admission of air currents from the fan to the radiator.

2. The combination with a radiator and the water circulation system thereof, of a fan casing and a fan therein, and a chute connecting said casing and radiator, a series of shutters located in the chute adjacent the radiator, and a thermostat included in the circulation system operatively connected to actuate said shutters as described.

3. The combination in a cooling system including the radiator, engine, and water circulation devices, of a fan casing and fan therein and a chute connecting the casing and radiator for conveying air currents to the latter, a series of pivoted shutters in the chute adjacent the radiator, a crank arm for each shutter and a connecting rod for said arms, a thermostat in the water circulating system, and operating devices connecting the thermostat with said arm, as described.

In testimony whereof I affix my signature.

WILBERT W. STAUFFER.